Z. P. LANDRUM.
Horse-Powers.
No. 141,363.  Patented July 29, 1873.
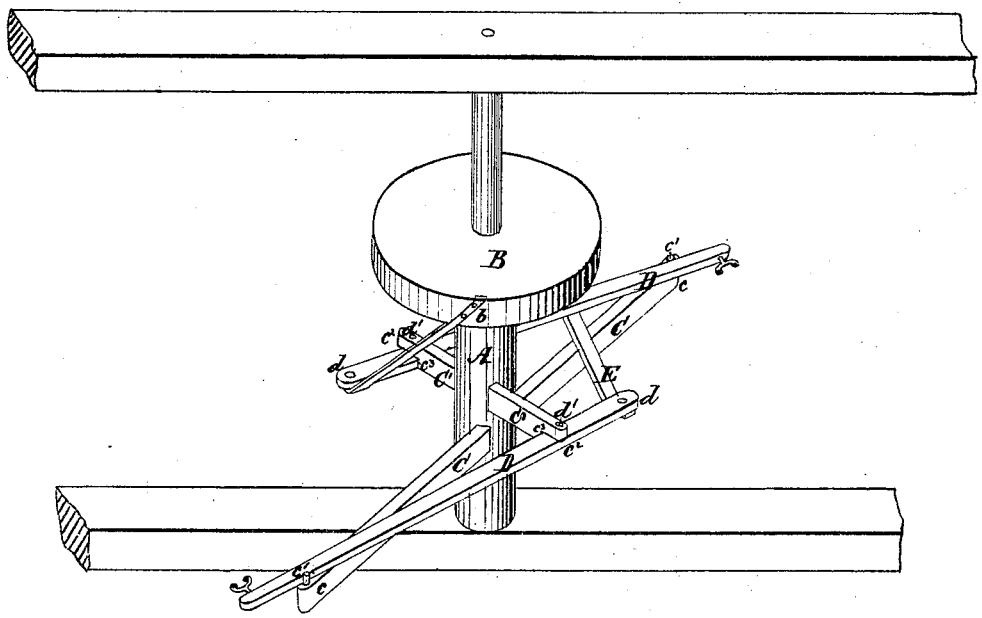
Witnesses:
G. Mathis.
Solon C. Kemon
Inventor:
Zachariah P. Landrum
Per
Attorneys.

UNITED STATES PATENT OFFICE.

ZACHARIAH P. LANDRUM, OF COLUMBUS, MISSISSIPPI.

IMPROVEMENT IN HORSE-POWERS.

Specification forming part of Letters Patent No. 141,363, dated July 29, 1873; application filed May 27, 1873.

*To all whom it may concern:*

Be it known that I, ZACHARIAH P. LANDRUM, of Columbus, in the county of Lowndes and State of Mississippi, have invented a new and useful Improvement in Horse-Power; and I do hereby declare the following to be a full, clear, and exact description of the same, reference being had to the accompanying drawing forming part of this specification, in which the figure represents a perspective view of my improvement.

The invention consists in an improvement upon the horse-power for which Letters Patent were issued to me on the 18th day of February, 1873, as hereinafter described, and pointed out in the claim.

In the drawing, A represents the vertical shaft, and B the drive-wheel, on whose periphery comes the strain of the machinery. C C' are bars passing diametrically through the central shaft A, and D D two sweeps, which cross obliquely on top of the long diametrical bar at $c$, resting against a stop, $c^1$, and under the short diametrical bar at $c^2$, resting at the latter point in a notch against a shoulder, $c^3$, made in the end of said short shaft. At this point they are also connected by an iron bolt, which, with the shoulder, form the fulcrum. Attached to the periphery at $b$ is an iron bar, E, one and a half inch wide, one-half inch thick, and seven feet long. It is fastened to the periphery by bolts, and descends at an angle of about forty degrees to the end of the sweep to which it is bolted. The periphery of the wheel being placed on the shaft A about three feet above the point at which the diametrical bars pass through said shaft, it becomes necessary for the sweeps to pass under the short bar to overcome the tendency in the attached ends of the sweeps to rise upward when power is applied. The distance from the weight end $d$ of sweeps to the fulcrum $d'$ is from twenty to twenty-four inches, while the distance from fulcrum to the power-end of sweeps is from eighteen to twenty feet.

It will be perceived, by reference to my original patent, that the shaft upon which the fulcrum is fixed represents exactly the radial bar or brace in the parallelogram upon which the fulcrum-strain is brought to bear in the former invention, and the change that I now make consists in dropping or doing away with the parallelogram and retaining the brace. It will be perceived also, that instead of using a vertical cast-iron bar extending from the periphery of the wheel, I use a stationary wrought-iron bar dropping from the periphery to the lever at an angle of about forty degrees.

This method of application has all the power of the original design, and is so simple that the cost of application is a mere trifle.

Having thus described my invention, what I claim as new, and desire to secure by Letters Patent, is—

The combination of wheel B, bars C C', having, respectively, stop and shoulder sweep D and oblique bar E, in the manner and for the purpose described.

ZACHARIAH P. LANDRUM.

Witnesses:
W. T. HARVEY,
HART RUSSEL.